Feb. 24, 1925.

M. PATTI 1,527,911

PRESS FOR CRUSHING FRUITS

Filed Feb. 1, 1921

Mario Patti.
INVENTOR

BY Victor J. Evans
ATTORNEY

WITNESS:

Patented Feb. 24, 1925.

1,527,911

UNITED STATES PATENT OFFICE.

MARIO PATTI, OF NEW YORK, N. Y.

PRESS FOR CRUSHING FRUITS.

Application filed February 1, 1921. Serial No. 441,667.

*To all whom it may concern:*

Be it known that I, MARIO PATTI, a subject of the King of Italy, residing at New York city, in the county of New York and State of New York, have invented new and useful Improvements in Presses for Crushing Fruits, of which the following is a specification.

This invention relates to presses for crushing fruits, olives and vegetables and extracting the juices and oils therefrom.

The principal object of the device is to provide a mechanism of this nature which shall consist of a few simple parts, cheap to manufacture and assemble and highly efficient for the purpose for which it is designed.

Another object is to provide a device of this nature with a simple adjusting means for regulating the amount of pressure to which the pulp will be subjected before being expelled from the machine.

With these and other objects in view which will be more apparent as the specification proceeds, the invention resides in certain novel construction and combination and arrangement of parts, the essential features of which are hereinafter fully described, are particularly pointed out in the appended claim, and are illustrated in the accompanying drawing, in which:—

Like characters of reference refer to like parts in all views.

Figure 1:
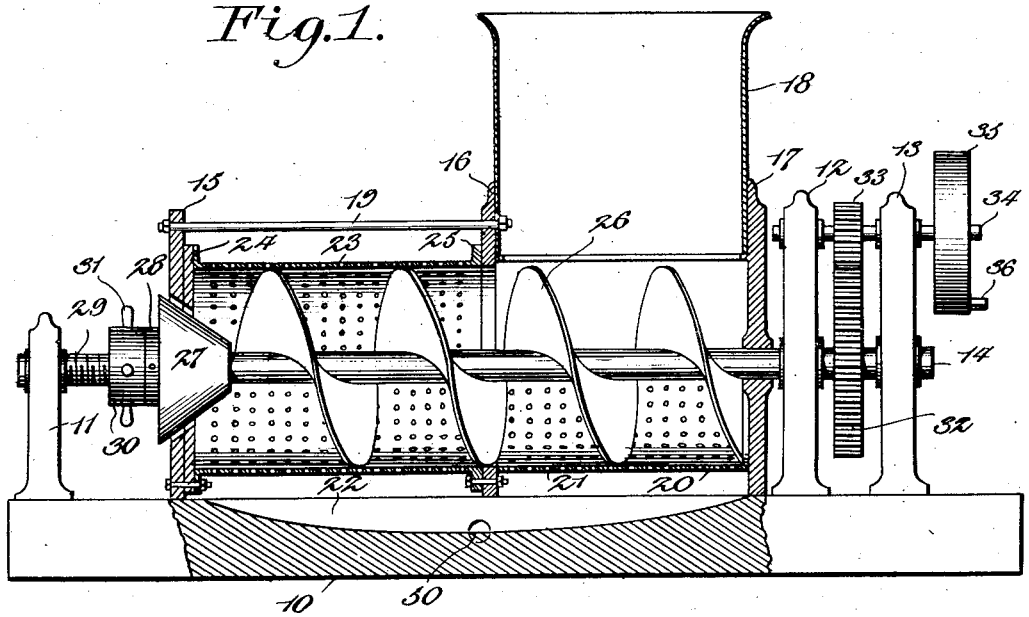
Figure 1 is a vertical longitudinal sectional view of my improved machine as constructed for the extraction of grape juice.
Figure 2:
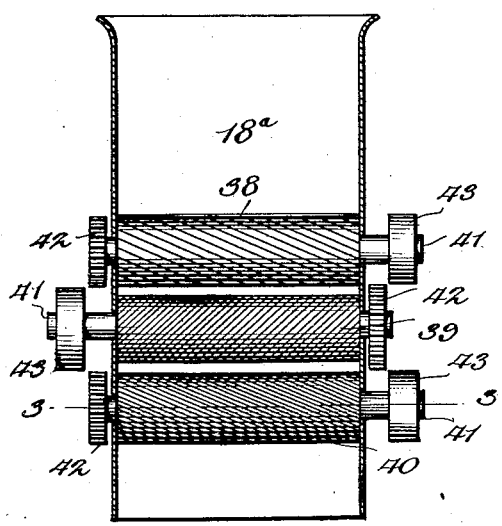
Figure 2 is a similar view of the hopper to be used with the machine when olives or other hard fruits and vegetables are to be crushed prior to the pressing operation.
Figure 3:
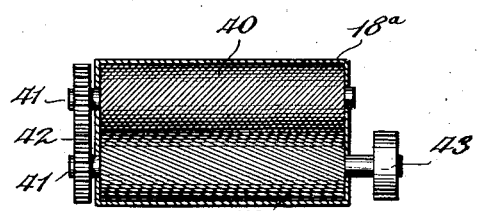
Figure 3 is a horizontal sectional view on line 3—3 of Figure 2.

Referring to the drawing in detail, 10 represents the base of the machine which is provided with upstanding brackets 11, 12 and 13 in which is revolubly supported a shaft 14. Three frame members 15, 16 and 17 are secured to the base, and through all of these the shaft 14 passes. A hopper 18 is adapted to be supported between the frames 16 and 17 and may be secured in place in any desired manner as by the bolts 19 which hold frames 15 and 16 in proper relationship.

Below the hopper 18 and receiving the fruits or vegetables therefrom is a member 20 the lower portion of which is preferably semi-cylindrical and provided with perforations 21 for permitting the escape of liquid into a well 22 formed in the base 10. The member 20 may be secured to frames 16 and 17 by bolts or any other suitable means.

A cylinder of iron or other suitable metal and of foraminous material is shown at 23 and is provided with end flanges 24 and 25 by which it may be secured to the frames 15 and 16.

Mounted on the central portion of shaft 14 and extending through members 20 and 23 is a worm or Archimedean screw 26, at the end of which a pressure adjusting member 27 in the form of a truncated cone is placed and is adapted to more or less completely close the end openings in the members 15 and 24. A collar 28 is keyed on the shaft 14 outside of member 27 and the outer end of the shaft adjacent to its bearing in member 11 is formed with a thread 29 on which is screwed the adjusting nut 30 which is provided with radiating handles 31.

Figures 4, 5:
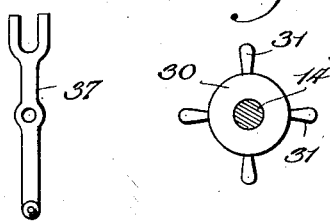
Figure 4 is a detail view of the operating handle.
Figure 5 is a detail view of the regulator nut.

Mounted on the shaft 14 between the uprights 12 and 13 is a gear 32 which meshes with a pinion 33 mounted on a counter shaft 34 mounted for rotation in the members 12 and 13. Secured to the outer end of shaft 34 is a pulley 35 by means of which the device may be connected to a motor or other source of power. A wrist pin 36 extends from pulley 35 and to this may be attached a handle 37 shown in detail in Figure 4.

When olives or hard vegetables are to be operated upon, the hopper 18 is removed and is replaced by a hopper 18ª in which are placed in vertically spaced relation, three pairs of crushing rollers, numbered respectively 38, 39 and 40. All of the rollers are provided with crushing or cutting blades or ridges, those of the upper pair 38 being coarser than those of the intermediate rollers 39, and those of the lowest rollers 40 being the finest of all three. These rollers are mounted upon shafts 41, and the shafts of each pair are connected by intermeshing gears 42. One shaft of each pair or couple is provided with a driving pulley 43 for permitting operation by a motor or like device.

It will be obvious that fruit or vegetables entered in the hopper 18 or 18ᵃ will be passed down onto the conveyor screw 26 either in a whole or crushed condition according to the hopper used. The screw 26 will force the pulp along and finally expel it through the aperture in members 15 and 24 and around the member 27. Any juice or oil will be expressed and drop down into well 22 from which it may be conducted by a pipe 50 to any desired receptacle. It is evident that by screwing the member 30 back and forth, member 27 may be made to more or less completely choke the apertures in members 15 and 24 thereby increasing or decreasing the pressure necessary to force the pulp out through the exit aperture.

While I have described what is deemed to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A press of the character described comprising a base having its upper face concaved to provide a well adapted to receive the juice from the elements being pressed, a pair of uprights on the base, a spiral blade journaled in the uprights, a plurality of frame members arranged on the base in longitudinal alinement, a foraminated cylinder held between one pair of the frame members, a hopper received in the frame members, a bolt passing through one pair of the frame members and through one wall of the hopper to retain the same in position, said bolt being adapted to be disengaged from the mentioned parts to permit the hopper to be removed and a new one arranged in its place, and means for rotating the spiral blade.

In testimony whereof I have affixed my signature.

MARIO PATTI.